No. 791,194.

Patented May 30, 1905.

UNITED STATES PATENT OFFICE.

WILLIAM HOOPES, OF PITTSBURG, PENNSYLVANIA.

PROCESS OF MANUFACTURING AMMONIA.

SPECIFICATION forming part of Letters Patent No. 791,194, dated May 30, 1905.

Application filed December 14, 1904. Serial No. 236,866.

*To all whom it may concern:*

Be it known that I, WILLIAM HOOPES, of Pittsburg, Allegheny county, Pennsylvania, have invented a new and useful Process of Manufacturing Ammonia, of which the following is a full, clear, and exact description.

The method of obtaining ammonia anhydrous ($NH_3$) or aqua-ammonia ($NH_4HO + XH_2O$) which is in common use and by which ammonia is at present made consists of taking the raw product (ammonium sulfate) and extracting the sulfuric acid by means of lime according to the reaction

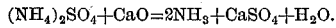

$$(NH_4)_2SO_4 + CaO = 2NH_3 + CaSO_4 + H_2O.$$

The result of this method of working is to make almost worthless the sulfuric acid of the ammonium sulfate, since the calcium sulfate formed is worth little or nothing.

I have discovered that if aqueous solutions of ammonium sulfate and another salt are electrolyzed on respectively opposite sides of a porous diaphragm in a cell having a cathode of carbon, iron, or other suitable material and an anode of carbon or other insoluble material ammonia is set free at the cathode and sulfuric acid at the anode, that the compound formed by the liberated sulfuric acid may then be utilized, and that the operation may be conducted at so slight an expense that the cost of obtaining the ammonia is nearly or completely met by the value of the by-products of the process.

The following is a working example of my invention: An electrolytic cell is made having two compartments separated from each other by a porous partition, one containing an iron cathode and the other a carbon anode. The cathode-compartment is then filled with a solution of ammonium sulfate and the anode-compartment with a solution of common salt, (NaCl,) and the whole may be heated to a temperature of about 100° centigrade. On passing current the ammonia ion is liberated at the cathode and the sulfuric-acid ion is liberated in the anode compartment. A reaction goes on as follows:

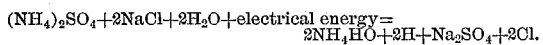

$$(NH_4)_2SO_4 + 2NaCl + 2H_2O + \text{electrical energy} = 2NH_4HO + 2H + Na_2SO_4 + 2Cl.$$

The ammonia, in whole or in part, goes off from the cathode-compartment with the free hydrogen, from which it may be separated by passing through water, in which it dissolves, the hydrogen passing on and being collected in a suitable vessel. The chlorin is liberated in the anode-compartment, from which it may be piped away and used in any manner desired. For example, it may be burned in the hydrogen collected from the cathode, forming hydrochloric acid, which is dissolved in water and sold. The sodium sulfate formed remains dissolved in the water of the bath, from which it may be crystallized in the usual manner and sold. At present market prices the sodium sulfate and hydrochloric acid so made will pay for all the materials used and for the major portion of the cost of operating the process, leaving the net cost of the ammonia nearly nothing. Ammonium sulfate and sodium chlorid are added to the bath from time to time to replace that which is consumed. A similar process may be carried on by the electrolysis of other ammonia salts, as ammonium nitrate, ammonium chlorid, &c., and I do not limit the process to the use of ammonium sulfate, although that salt is preferable on account of its low price.

I claim—

1. The method herein described of making ammonia, which consists in electrolyzing an aqueous solution of an ammonium salt in the cathode-compartment of a cell having a porous diaphragm and containing in the anode-compartment a solution of another salt.

2. The method herein described of making ammonia, which consists in electrolyzing an aqueous solution of an ammonium salt in the cathode-compartment of a cell having a porous diaphragm and containing in the anode-compartment a solution of a chlorid other than ammonia chlorid.

3. The method herein described of making ammonia, which consists in electrolyzing an aqueous solution of an ammonium salt in the cathode-compartment of a cell having a porous diaphragm and containing in the anode-compartment a solution of sodium chlorid.

4. The method herein described of making ammonia, which consists in electrolyzing an aqueous solution of an ammonium salt in the cathode-compartment of a cell having a porous diaphragm and containing in the anode-compartment a solution of another salt, producing ammonia and hydrogen at the cathode and separating the ammonia from the hydrogen.

5. The method herein described of making ammonia, which consists in electrolyzing an aqueous solution of an ammonium salt in the cathode-compartment of a cell having a porous diaphragm and containing in the anode-compartment a solution of a chlorid other than ammonium chlorid, producing ammonia and hydrogen at the cathode, separating the ammonia from the hydrogen, and combining the hydrogen with chlorin.

In testimony whereof I have hereunto set my hand.

WILLIAM HOOPES.

Witnesses:
Thomas W. Bakewell,
H. M. Corwin.